United States Patent [19]

Menzel

[11] 4,273,286
[45] Jun. 16, 1981

[54] CONDUIT FOR DRIP IRRIGATION SYSTEMS

[75] Inventor: Stanley W. O. Menzel, Sydney, Australia

[73] Assignee: RIS Irrigation Systems, El Cajon, Calif.

[21] Appl. No.: 962,111

[22] Filed: Nov. 20, 1978

[30] Foreign Application Priority Data

Nov. 29, 1977 [AU] Australia .............................. PD2595

[51] Int. Cl.³ ............................................. B05B 15/00
[52] U.S. Cl. ................................... 239/272; 239/542; 239/547; 138/128
[58] Field of Search .............. 239/542, 547, 271, 272; 138/108, 128, 99

[56] References Cited

U.S. PATENT DOCUMENTS

| Re. 28,095 | 7/1974 | Chapin | 239/542 X |
|---|---|---|---|
| 2,937,664 | 5/1960 | Plummer | 138/128 |
| 3,091,401 | 5/1963 | Hruby | 239/547 X |
| 3,455,336 | 7/1969 | Ellis | 138/99 X |
| 3,980,104 | 9/1976 | Kabai | 239/547 X |

Primary Examiner—Richard A. Schacher
Attorney, Agent, or Firm—Gordon L. Peterson

[57] ABSTRACT

A conduit for drip irrigation systems having a wall of a pierceable material characterized by a series of inwardly formed dimples along the length thereof and arranged to be pierced by a piercing member on an off-take or sprinkler, the dimples having a selected wall thickness in relation to the wall of the conduit, the conduit being optionally provided with ribs at the dimples to give further securing means and optionally including a tension wire or member for support.

10 Claims, 7 Drawing Figures

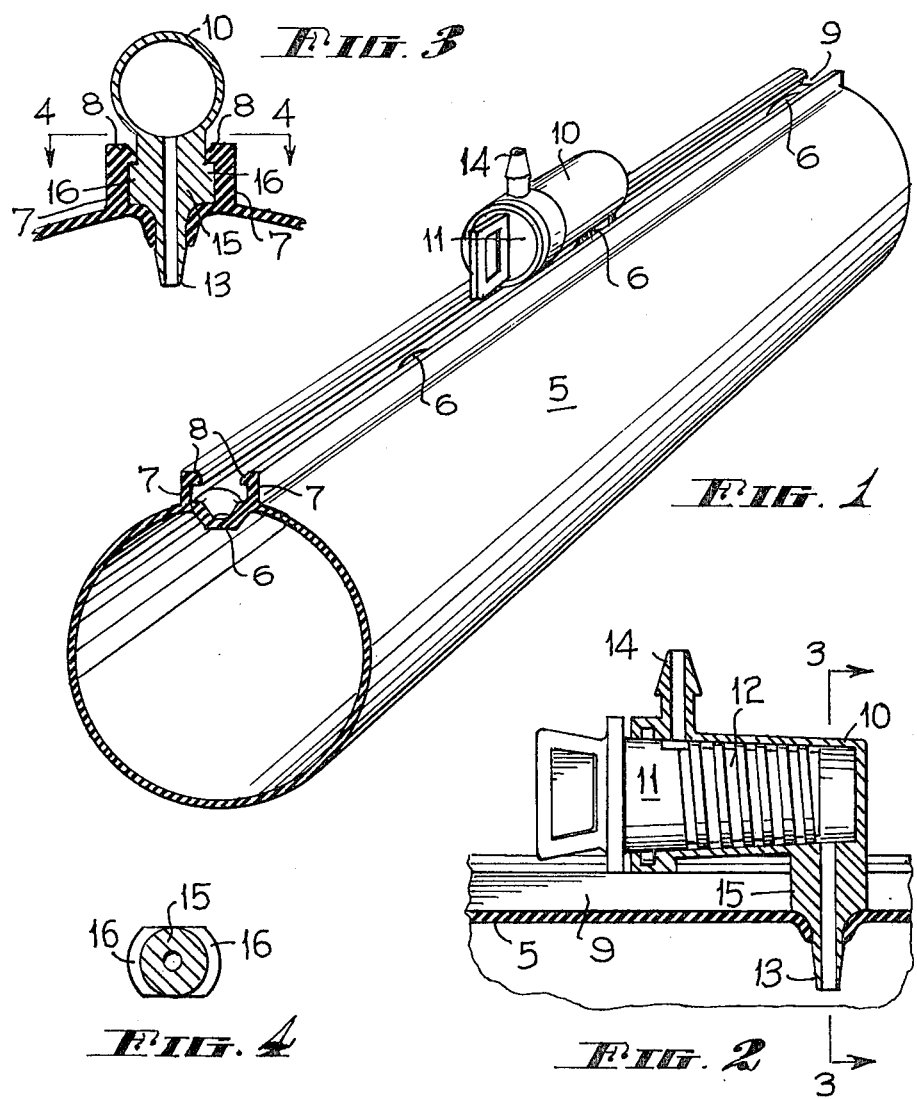

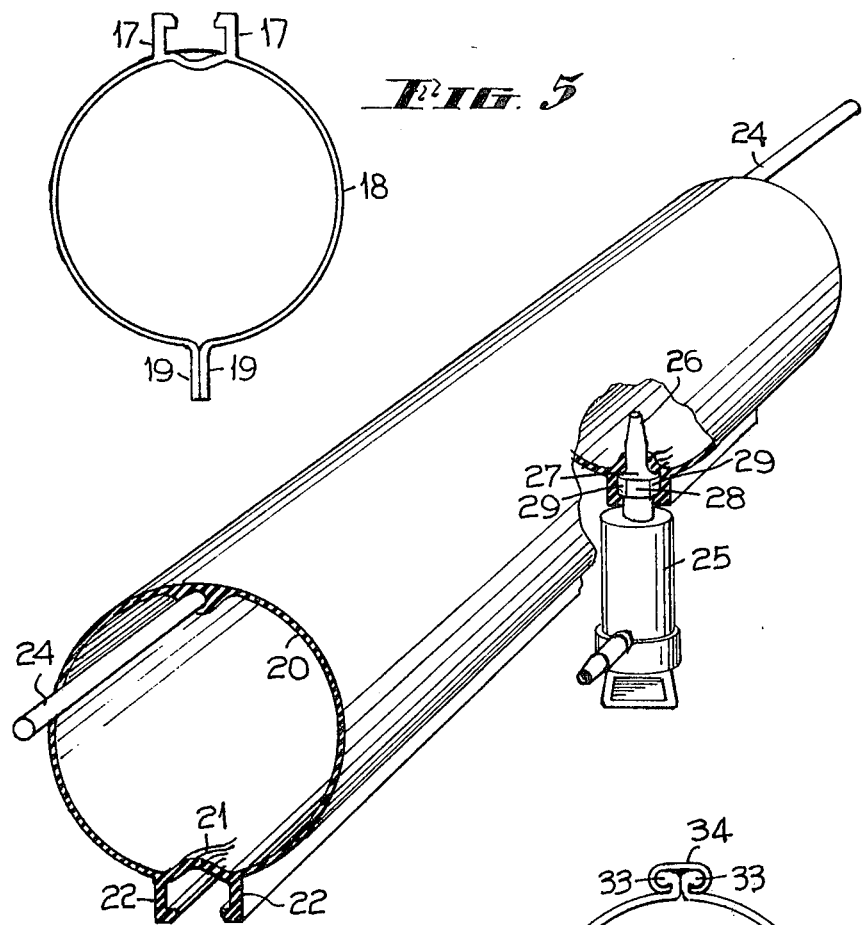

CONDUIT FOR DRIP IRRIGATION SYSTEMS

This invention relates to a conduit for drip irrigation systems.

THE PRIOR ART

The main conduit for delivering water to a drip irrigation field is normally 30 mm to 150 mm in diameter. These conduits are laid either centrally in a field or at the head of a field. At intervals of approximately 1.5 mm off-takes are fitted to the conduit to allow for the drip tube laterals to be affixed thereby allowing the laterals to get their water supply. These connections can either be a simple 6 mm polyethylene tube inserted into a punched or drilled hole, or a rubber grommet or similar connection is fixed to the wall of the conduit.

THE OBJECTS

The object of the invention is to provide an improved conduit in which "off-takes" or sprinklers or drip feed devices can be more effectively attached.

A further object is to strengthen the conduit at the "off-take" location.

A still further object is to provide effective securing means for the "off-take" or sprinkler or drip feed devices.

A still further object is to provide means to allow the tube to be supported in positions where the tube would be under excessive tension.

THE INVENTION

This invention relates to an improvement in the wall of a semi-flexible main or secondary conduit whereby at intervals, such as at 30 cm, a 'dimple,' which may be in the form of an inwardly positioned truncated cone, is formed longitudinally along the conduit. According to one form this 'dimple' is perhaps 3 mm at its apex and 5 mm at its base and 2 to 3 mm deep, but the shape of the dimple can vary according to the type of off-take and other factors.

The dimple allows for a positive seal onto any type of insert by simply punching or piercing a hole in the bottom of the 'dimple,' and because of the preformed shape of the dimple in the wall of the tube the hole can readily be enlarged to a diameter of up to 6 mm or more without splitting the wall of the conduit.

According to a further embodiment of the invention the 'dimples' are positioned adjacent to or between longitudinal stiffening ribs extruded outwardly on one or both sides of the 'dimples' to reinforce that portion of the conduit and at the same time create an added locking device for any attachments that are affixed to the main conduit, the dimples thus being formed in a channel on the conduit, also as the conduit can be very thin in the wall (0.5 mm), a thicker section in the wall can be formed between the longitudinal barbs or ribs thus allowing the 'dimples' to be in the thicker wall section.

In addition the ribs and dimples can be in two or more segments of the tube's diameter if required.

A further feature of the invention is the use of a tension member which can, for instance, be a wire moulded into the wall of the tube or attached thereto such as by use of a tension member which crimps together with the two edges of a strip to form it into a tube.

The conduit itself can be formed in any particular manner, but it may be moulded or extruded in ribbon form and then bent to tubular form and the edges joined by welding or cementing or the edges can 'zip' together by having appropriate configuration.

DRAWINGS OF THE PREFERRED FORM

FIG. 1 is a somewhat diagrammatic perspective view of a conduit according to one form of the invention showing a flow control member attached thereto.

FIG. 2 is a section of a portion of a conduit showing the flow control member attached thereto.

FIG. 3 is a transverse section on line 3—3 of FIG. 2.

FIG. 4 is a section on line 4—4 of the flow control member only.

FIG. 5 is an end elevation of a conduit which has been formed by extruding a strip with the edges of the strip joined together to form a tube.

FIG. 6 is a view corresponding to FIG. 1 but showing the conduit with a tensioning member embodied in its wall and a suspended flow control member as used in trellising, and FIG. 7 is an end view of a conduit which has been extruded in the form of a strip and showing the edges of the strip joined together by a tensioning member.

DESCRIPTION OF THE PREFERRED EMBODIMENTS

Referring first to FIGS. 1 to 4, the conduit 5 is formed of an extruded plastic material and has along its length a series of dimples 6 which are positioned between stiffening ribs 7 which are upstanding on the wall of the conduit 5 and has what we term barbed ends 8 the purpose of which is to reduce the width of the channel 9 which is formed between the ribs 7 to allow off-takes to be firmly secured in position after the tube has been pierced at a dimple to place the off-take into communication with the inside of the tube.

In the embodiment shown the off-take is in the form of a flow control member comprising a hollow body 10 in which is a plug 11 which has in it a helical groove 12 disposed between the inlet 13 and the outlet 14, such devices already being known in the trade, but this flow control member has its inlet shaped so that the end 13 can pierce the dimple as shown particularly in FIG. 2 and has an enlarged portion 15 which is shaped particularly as shown in FIGS. 3 and 4 in that the enlarged portion 15 has on it a pair of wings 16 so that in one position the piercing end 13 can be passed through the dimple and if the device is then turned at right angles the wings 16 engage beneath the members 8 to firmly lock the flow control member in position.

The wall of the dimple can be much thicker than the wall of the conduit if this is necessary or it can be shaped in any way to assist the piercing action and to then hold to the wall of the piercing device as shown particularly in FIG. 3 to ensure that there will be no leakage past the piercer.

As shown in FIG. 1 the conduit is formed by extruding the final shape but in FIG. 5 is shown another embodiment in which the conduit is extruded as a strip 18, the two edges 19 of which are joined together by cementing means.

In the form shown in FIG. 6 the conduit 20 has the dimples 21 formed in it as heretofore between the ribs 22 but the wall of the conduit 20 has moulded into it a wire tensioning member 24 which extends the length of the conduit to give sufficient strength in tension to enable the conduit to be supported between posts or the like for use in watering trellised plants and again the flow control member 25 has the piercing point 26 on it and an enlarged portion 27 which has on it the flats 28 and wings 29 so that the flow control member is again firmly supported.

In the form shown in FIG. 7 a strip 30 is extruded and again has a series of dimples 31 formed along its length between the ribs 32, but the edges of the strip have beads 33 on them which can be engaged by a member 34 which serves to lock the two edges of the strip together but this member 34 can be constructed of a material such as metal which can then also form a tensioning member corresponding to the tensioning member 24.

The ribs 32 in this case are shown without the expanded end portions and could for instance be apertured to allow members to be tied to them, as it will be obvious that various forms of attachment can be made of the flow control members to the conduit and it would also be possible to have the end of the piercing member barb-shaped in such that as it is pushed through the wall of the conduit at the dimple location it will lock to the wall to prevent ready withdrawal, this and other variations falling within the spirit of this invention.

I claim:

1. A conduit for drip irrigation systems formed of an extrudable plastic material which conduit comprises:
   (a) a tube having a wall of a selected thickness for conveying pressure fluids,
   (b) the wall of said tube having a series of inwardly formed dimples along the length of the said tube, said dimples being pierceable by a piercing member by rupturing an inner part of the said dimples to leave the ruptured dimple wall in pressure contact with a said piercing member, and
   (c) outwardly formed stiffening ribs extending along the said conduit immediately on each side of the said dimples whereby the dimples are positioned in a channel extending along the said conduit.

2. A conduit according to claim 1 wherein the said dimple is formed as a truncated cone with a closed but pierceable end.

3. A conduit according to claim 1 or 2 wherein the wall of the conduit is thickened at the said dimples.

4. A conduit according to claim 1 wherein at least one of the said ribs has a thickened outer edge to decrease the width of the said channel at the outer part of the ribs whereby to form locking means for off-takes which pierce the said dimples.

5. A conduit according to claim 1 wherein said dimples have a wall thickness, at least on part of the dimple wall, greater than the wall thickness of the said tube.

6. A conduit for drip irrigation systems formed of an extrudable plastic material which conduit comprises:
   (a) a tube having a wall of a selected thickness for conveying pressure fluids,
   (b) a series of inwardly formed dimples along the length of the said tube, said dimples having a wall thickness, at least on part of the dimple wall, greater than the wall thickness of the said tube whereby each said dimple is pierceable by a piercing member by rupturing an intermediate part of the said dimple to leave the ruptured dimple wall in pressure contact with a said piercing member, and
   (c) upstanding ribs on the said tube on each side of the said dimples to form a channel to further engage the said piercing means to further hold the said piercing means.

7. A conduit according to claims 1 or 6 further characterised by a tension member formed to be integral with the said conduit and extending along the length of the said conduit.

8. A conduit according to claim 7 wherein the said tension member is a wire moulded into the wall of the said conduit during extrusion of the said conduit.

9. A conduit according to claim 7 wherein the said conduit is formed of a ribbon which is bent to tubular form about a longitudinal axis and the edges are crimped together by a strip which engages the said edges, the said strip forming the said tension member.

10. A conduit for drip irrigation systems formed of an extrudable plastic material which conduit comprises:
    (a) a tube having a wall of a selected thickness for conveying pressure fluids,
    (b) a series of inwardly formed dimples along the length of the said tube, said dimples having a wall thickness, at least on part of the dimple wall, greater than the wall thickness of the said tube whereby each said dimple is pierceable by a piercing member by rupturing an intermediate part of the said dimple to leave the ruptured dimple wall in pressure contact with a said piercing member,
    (c) upstanding ribs on the said tube adjacent to the said dimples to form a channel in which the said dimples are located,
    (d) means on the said ribs to engage the said piercing member to removably lock the said piercing member to the said conduit, and
    (e) a tension member extending along the length of the said conduit to form part thereof to support the said conduit when attached to spaced supports.

* * * * *